Patented Dec. 29, 1936

2,066,197

UNITED STATES PATENT OFFICE 2,066,197

OIL SOLUBLE SULPHONATES OF ACTIVE BASES AND THE METHOD OF PREPARING THE SAME

Hyym E. Buc, Roselle, N. J., assignor to Standard Oil Development Company, a corporation of Delaware No Drawing. Application September 4, 1929, Serial No. 390,434

6 Claims. (Cl. 260—25)

This invention relates to a process of making oil-insoluble physiologically active organic compounds soluble in oil. More specifically it relates to a process of preparing sulphonic acid derivatives of physiologically active organic compounds having a basic group. The invention also comprises the products produced by such process.

It is often desirable to make oil-insoluble medicinal compounds, insecticides, insect repellents and other physiologically active organic compounds soluble in oils, such as petroleum distillates. I have discovered that such compounds can be made soluble in oils, and compounds of limited solubility can be made more easily soluble, by causing the same to combine with an oil-soluble sulphonic acid derived from petroleum. The organic compounds which can be made to react in this manner must contain a basic group either in combination with an acid or capable of combining with an acid.

The oil soluble sulphonic acids used in my process are formed in the treatment of petroleum oils with concentrated sulphuric acid, fuming sulphuric acid, or sulphuric anhydride and remain dissolved in the oil after the treatment. The sludge formed during the treatment also contains certain sulphuric acid derivatives but these have different characteristics and I do not intend to use them in my invention. The above mentioned oil-soluble sulphonic acids are separated from the oil by extraction with various solvents, such as isopropyl alcohol, and are used either in the acid state or in the form of their salts such as alkali metal salt for the purposes of my invention. It may be mentioned that the fuming sulphuric acid treatment is one of the main process steps in the preparation of the so-called white oils, such as the ones known under the trade names "Nujol", "Marcol", etc. and therefore the manufacture of white oils provides an ample source of oil-soluble sulphonic acids.

The composition of these sulphonic acids is very various according to the oil from which they originate and they have been given the general formulae $C_nH_{n-12}SO_3$ and $C_nH_{2n-10}SO_3$. Their molecular weight is estimated to be between 400 and 500. The preferred sulphonic acids are obtained by treating a petroleum distillate of an A. P. I. gravity of about 20° to 30° and Saybolt viscosity of 100 to 250 seconds at 100° F. with fuming sulphuric acid of from 5 to 15% $SO_3$. Concentrated sulphuric may also be used, though the yield of sulphonic acid is less. The sour oil after the separation of the acid sludge is washed with a solvent such as isopropyl alcohol and the separated alcohol extract is evaporated to remove the alcohol, leaving the sulphonic acids as a residue. When the term "concentrated acid" is used, it will be understood to include fuming acid.

The combination of the physiologically active organic compounds with the sulphonic acid may be brought about by contacting the compound with the sulphonic acid, or a salt thereof in an acid medium. My preferred method of operation, however consists in carrying out the reaction in a diluted acid medium. The reaction will be accelerated by agitation and moderate heat. The reaction product is obtained as a precipitate and may be further purified by methods well known in organic chemistry.

The following example will illustrate one method of carrying out my invention.

An alkali metal salt such as the sodium salt of the oil-soluble sulphonic acid is added to an aqueous solution of nicotine together with sufficient amount of mineral acid such as hydrochloric acid to liberate the sulphonic acid and keep the mixture acid. The acid condition may be verified by any of the known means such as testing with litmus paper, etc. The mixture is stirred and gently heated. The nicotine sulphonate precipitates out in form of a gummy mass which is separated by filtration, washed and dried, preferably at moderate temperature. It may also be further purified by dissolving it in any of the known organic solvents. The approximate amounts of raw materials used are: 1 part by weight of nicotine, 1½ parts or less of sodium sulphonate obtained in the manufacture of medicinal white oil. It will be understood that the amount of sodium sulphonate will vary with the oil base from which the oil-soluble sulphonic acid is obtained. It is preferable to have a slight deficiency of the sulphonate, otherwise the precipitate may not coagulate well.

By an entirely similar method I have prepared sulphonic acid compounds of the principal alkaloids of cinchona bark, i. e. of quinine, quinidine, cinchonine, cinchonidine. Another compound of different chemical class, of which I have prepared the sulphonic acid derivative, is p-amino phenol.

It will be understood that the above example is given by way of illustration only and my process may be carried out in various modifications. I do not, therefore, wish to limit my invention by the specific methods of procedure given in the description but only by the appended claims in which it is my intention to claim all novelty inherent in my invention.

I claim:

1. Method of rendering alkaloids more soluble in hydrocarbon oils comprising causing the alkaloids to react with oil soluble sulphonic acids derived from the treatment of a petroleum oil with a material containing sulphuric anhydride.

2. Salts of alkaloids formed by combining alkaloids with oil-soluble sulphonic acids derived from petroleum oil treated with concentrated sulphuric acid.

3. Oil soluble nicotine salts of sulphonic acids, said acids being derived from petroleum oils.

4. Oil soluble cinchona bark alkaloid salts of sulphonic acids, said acids being derived from petroleum oils.

5. Oil soluble petroleum sulphonic acid salts of quinine alkaloids.

6. Oil soluble petroleum sulphonic acid salts of cinchona alkaloids.

HYYM E. BUC.